United States Patent
Balmakhtar et al.

(10) Patent No.: US 10,341,195 B1
(45) Date of Patent: Jul. 2, 2019

(54) VIRTUAL NETWORK FUNCTION (VNF) RESOURCE MANAGEMENT IN A SOFTWARE DEFINED NETWORK (SDN)

(71) Applicant: Sprint Communications Company L.P., Overland Park, KS (US)

(72) Inventors: Marouane Balmakhtar, Alexandria, VA (US); Arun Rajagopal, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 261 days.

(21) Appl. No.: 15/196,655

(22) Filed: Jun. 29, 2016

(51) Int. Cl.
G06F 15/16 (2006.01)
H04L 12/24 (2006.01)
H04L 12/26 (2006.01)
H04L 29/08 (2006.01)

(52) U.S. Cl.
CPC .............. *H04L 41/20* (2013.01); *H04L 41/12* (2013.01); *H04L 43/08* (2013.01); *H04L 67/10* (2013.01)

(58) Field of Classification Search
CPC ....................................................... H04L 41/20
See application file for complete search history.

(56) References Cited

U.S. PATENT DOCUMENTS

| | | |
|---|---|---|
| 8,600,792 B2 | 12/2013 | Drittler et al. |
| 9,210,061 B2 | 12/2015 | Richards et al. |
| 9,311,160 B2 | 4/2016 | Parker |
| 9,384,028 B1 * | 7/2016 | Felstaine ................. H04L 67/02 |
| 9,985,866 B1 * | 5/2018 | Rajagopal ............... H04W 8/02 |
| 10,110,462 B1 * | 10/2018 | Rajagopal ............... H04L 43/12 |
| 2014/0201374 A1 | 7/2014 | Ashwood-Smith et al. |
| 2014/0317261 A1 | 10/2014 | Shatzkamer et al. |
| 2015/0063166 A1 | 3/2015 | Sif et al. |
| 2015/0124622 A1 | 5/2015 | Kovvali et al. |
| 2015/0149613 A1 | 5/2015 | Kakadia et al. |

(Continued)

FOREIGN PATENT DOCUMENTS

| | | |
|---|---|---|
| WO | 2015031866 | 3/2015 |
| WO | 2015135611 | 9/2015 |

(Continued)

OTHER PUBLICATIONS

"Network Functions Virtualisation (NFV); Use Cases;" Group Specification; Oct. 2013; pp. 1-50; ETSI GS NFV 001 V1.1.1; France.

*Primary Examiner* — Kevin T Bates
*Assistant Examiner* — Clarence D McCray

(57) ABSTRACT

A Network Function Virtualization (NFV) Software Defined Network (SDN) controls NFV resources consumed by Virtual Network Functions (VNFs) that support a data service. An NFV Infrastructure (NFVI) executes SDN application VNFs, SDN controller VNFs, and SDN virtual Switches (vSWs) to support the data service. The NFVI responsively transfers SDN Key Performance Indicators (KPIs). An NFV Management and Orchestration (MANO) system processes the SDN KPIs to generate VNF control data to darken one of the SDN VNFs. The NFV MANO system processes the VNF control data to generate and transfer NFV control data to darken the SDN VNF. The NFVI darkens the SDN VNF responsive to the NFV control data by restricting access to NFVI hardware for the SDN VNF.

10 Claims, 9 Drawing Sheets

(56) References Cited

U.S. PATENT DOCUMENTS

| | | | |
|---|---|---|---|
| 2015/0180730 A1* | 6/2015 | Felstaine | H04L 41/022 |
| | | | 709/225 |
| 2015/0358248 A1* | 12/2015 | Saha | H04L 43/0817 |
| | | | 709/226 |
| 2018/0316730 A1* | 11/2018 | Schaefer | H04L 41/0883 |
| 2019/0052549 A1* | 2/2019 | Duggal | H04L 41/5045 |

FOREIGN PATENT DOCUMENTS

| WO | 2015143610 | 10/2015 |
|---|---|---|
| WO | 2015183940 | 12/2015 |
| WO | 2016037479 | 3/2016 |

\* cited by examiner

VIRTUAL NETWORK FUNCTION (VNF) RESOURCE MANAGEMENT IN A SOFTWARE DEFINED NETWORK (SDN)

TECHNICAL BACKGROUND

Data communication systems exchange user data for user devices to provide various data communication services. The user devices may be phones, computers, media players, and the like. The data communication services might be media streaming, audio/video conferencing, data messaging, or internet access. Software-Defined Networks (SDNs) have become a popular data communication system to deliver these data communication services.

An SDN has applications, controllers, and data machines. The SDN controllers expose network-level control-plane Application Programming Interfaces (APIs) to the SDN applications. The SDN applications call these SDN controller APIs to implement the data communication services. In a like manner, the SDN data machines expose network-level data-plane APIs to the SDN controllers. The SDN controllers call these SDN data machine APIs to implement the data communication services. The SDN data machines process user data in response to the SDN data machine API calls.

For example, an SDN application may determine that an update to an SDN Flow Descriptor Table (FDT) is required to support a user data service. The SDN application calls a controller API with the FDT update. The SDN controller calls a data machine API with the FDT update. The SDN data machine updates its FDT responsive to the data machine API call from the SDN controller. Subsequently, the SDN data machine receives user data packets, matches the packet addresses to an action in the updated FDT, and performs the action on the user data packets. The SDN data machines may forward, drop, or store the user data packets based on the FDT.

Many SDNs execute on Network Function Virtualization (NFV) computer systems. NFV computer systems have Virtual Network Functions (VNFs) that perform like typical communication network elements or portions of these network elements. The VNFs run under the control of a virtual layer (hypervisors, virtual containers, NFV applications) that control VNF access to NFV hardware (circuitry, memory, communication interfaces). To implement a data communication service, an NFV Management and Orchestration (MANO) system drives the NFV hardware to execute and support the VNFs based on NFV Service Descriptors for the data communication service. In NFV SDN systems, the VNFs may be SDN applications, SDN controllers, and SDN virtual data machines.

Unfortunately, the ability to control VNFs in SDNs is not optimal. NFV SDN systems do not support VNF controls in an effective manner. In particular, NFV SDN systems do not effectively use SDN Key Performance Indicators (KPIs) to manage NFV resources for the VNFs.

TECHNICAL OVERVIEW

A Network Function Virtualization (NFV) Software Defined Network (SDN) controls NFV resources consumed by Virtual Network Functions (VNFs) that support a data service. An NFV Infrastructure (NFVI) executes SDN application VNFs, SDN controller VNFs, and SDN virtual Switches (vSWs) to support the data service. The NFVI responsively transfers SDN Key Performance Indicators (KPIs). An NFV Management and Orchestration (MANO) system processes the SDN KPIs to generate VNF control data to darken one of the SDN VNFs. The NFV MANO system processes the VNF control data to generate and transfer NFV control data to darken the SDN VNF. The NFVI darkens the SDN VNF responsive to the NFV control data by restricting access to NFVI hardware for the SDN VNF.

DETAILED DESCRIPTION

Figure 1:
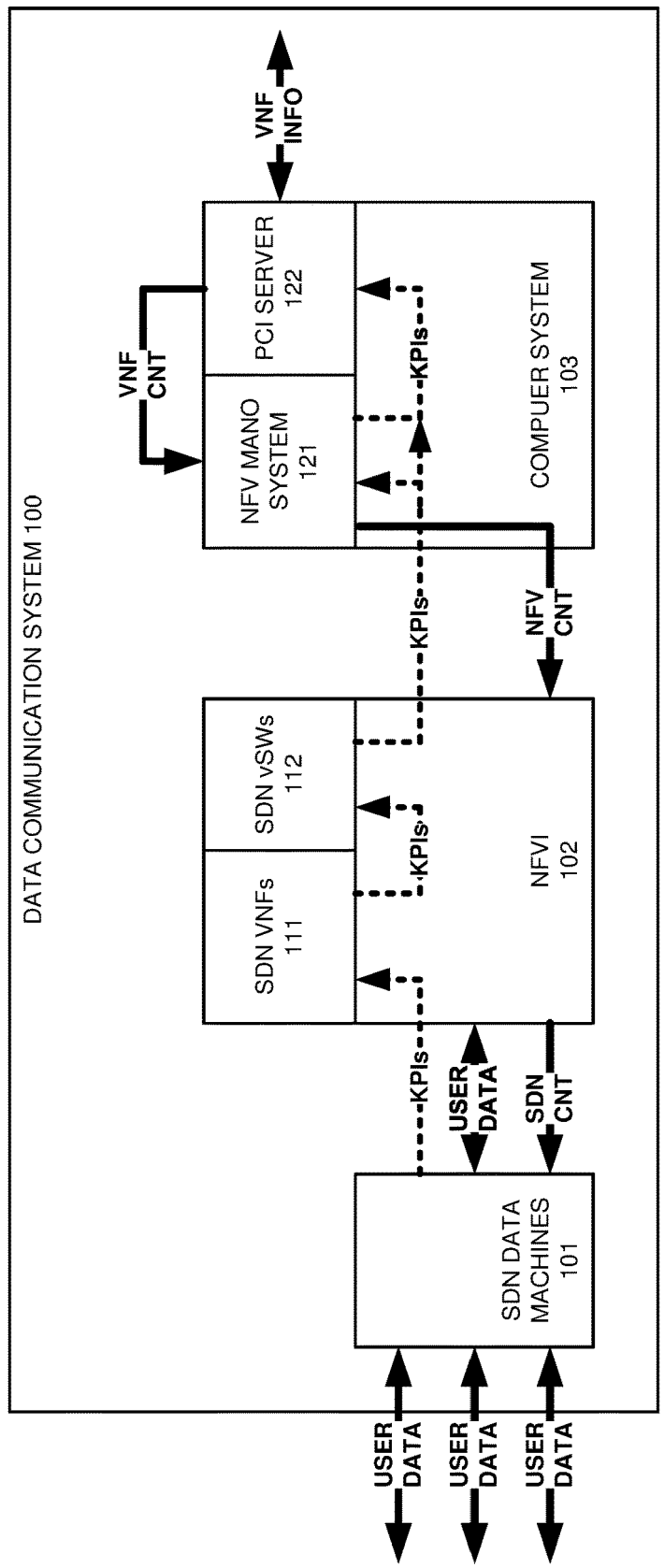
FIGS. 1-4 illustrate a data communication system to control Virtual Network Functions (VNFs) in a Network Function Virtualization (NFV) Software Defined Network (SDN).

FIGS. 1-4 illustrate data communication system 100 to control Virtual Network Functions (VNFs) in a Network Function Virtualization (NFV) Software Defined Network (SDN). Data communication system 100 exchanges user data for user devices like computers, phone, media players, or some other intelligent machines with communication transceivers. The data exchange supports data services such as media streaming, audio/video conferencing, file transfers, messaging, Internet access, or some other computerized information service.

Data communication system 100 comprises SDN data machines 101, NFV Infrastructure (NFVI) 102, and computer system 103. SDN data machines 101, NFVI 102, and computer system 103 each comprise data processing circuitry, data memory, operating software, and data communication transceivers. NFVI 102 comprises SDN VNFs 111 and SDN virtual Switches (vSWs) 112. Computer system 103 comprises NFV Management and Orchestration (MANO) system 121 and Proxy Correlation Index (PCI) server 122.

SDN VNFs 111 comprise SDN applications and controllers that are linked to each other through vSWs 112. The SDN controllers are linked to SDN data machines 101 through vSWs 112. Both the SDN applications and controllers are linked to computer system 103 through vSWs 112. To deliver a data service, the SDN applications transfer SDN controller Application Programming Interface (API) calls to the SDN controllers. The SDN controllers receive and process the SDN controller API calls to generate and transfer SDN data machine API calls.

SDN data machines 101 receive and process the SDN data machine API calls to perform actions on the user data like forwarding, storing, and dropping. Some user data may be transferred to NFVI 102 for more complex processing like video transcoding. SDN data machines 101 return data machine API responses to the SDN controller VNFs. In NFVI 102, the SDN controllers receive and process the data machine API responses to generate and transfer SDN controller responses that are sent to the SDN applications.

SDN vSWs 112 measure SDN KPIs and transfer SDN KPI data to PCI server 122—perhaps through NFV MANO system 121. The KPIs may comprise API call counts by call type and internal networking data to determine VNF loads. SDN data machines 101, NFVI 102, SDN VNFs 111, and/or NFV MANO system 121 may also measure KPIs and transfer this KPI data to PCI server 122. The KPIs may comprise fairly raw metrics like messages per time, or they may be more advanced like the average transaction times for Flow Description Table (FDT) updates in SDN data machines 101. The logical distribution of advanced KPI development between the SDN/NFV systems and PCI server 122 may vary.

PCI server 122 processes the SDN KPI data to generate various data system indices. PCI server 122 may combine a set of system indices into one or more combined system indices. In a simplified example, PCI server 122 may process KPI data to determine an amount of API calls, FDT updates, and user data transferred for a specific Uniform Resource Indicator (URI) in a given time period. PCI server 122 then develops an index for a data service based on these KPIs. A simple index might be: [Index #1=A*(#API calls)+ B*(#FDT updates)/C*(user data)]; where A, B, and C are normalizing and scaling factors. Another index might be: [Index #2=D*(average controller VNF load)+E*(average data machine load)+F*(average FDT update time)]; where D, E, and F are normalizing and scaling factors.

PCI server 122 processes the system indices to control SDN VNFs 111. In particular, PCI server 122 processes the indices to de-allocate (darken) and re-allocate (lighten) NFVI 102 resources for individual SDN VNFs 111. For example, SDN vSWs 112 may transfer VNF load KPIs that PCI server 122 indexes to identify idle VNFs 111 that should be darkened.

PCI server 122 transfers VNF control data to NFV MANO system 121. NFV MANO system 121 processes the VNF control data to generate corresponding NFV control data. NFVI 102 receives and implements the NFV control data. For example, NFVI 102 may darken one of VNFs 111 by restricting or removing the VNF's data processing, storage, and/or communication resources.

A given data service has an NFV Network Service Descriptor (NSD) with rules for the service that identify VNF Descriptors (VNFDs), VNF Forwarding Graphs (VNFFGs), and Physical Network Function Descriptions (PNFDs). The VNFDs specify requirements for VNFs 111. The VNFFGs specify VNF/vSW interconnections, and the PNFDs specify vSW/NFVI interconnections. The KPI data may indicate the NSD, VNFD, VNFFG, and or PNFD. PCI server 122 processes this KPI data to select VNF controls for a particular NSD, VNFD, VNFFG, and or PNFD—including combinations thereof.

SDN data machines 101 establish user data flows based on user/network identifiers. The user/network identifiers are typically information like device ID, user ID, network ID, IP address/port, Ethernet address/port, multi-protocol label, and the like. PCI server 122 may implement specific VNF controls for a particular device ID, network ID, IP prefix, IP address/port, Ethernet Virtual Local Area Network (VLAN) ID, or some other networking data.

Figure 2:
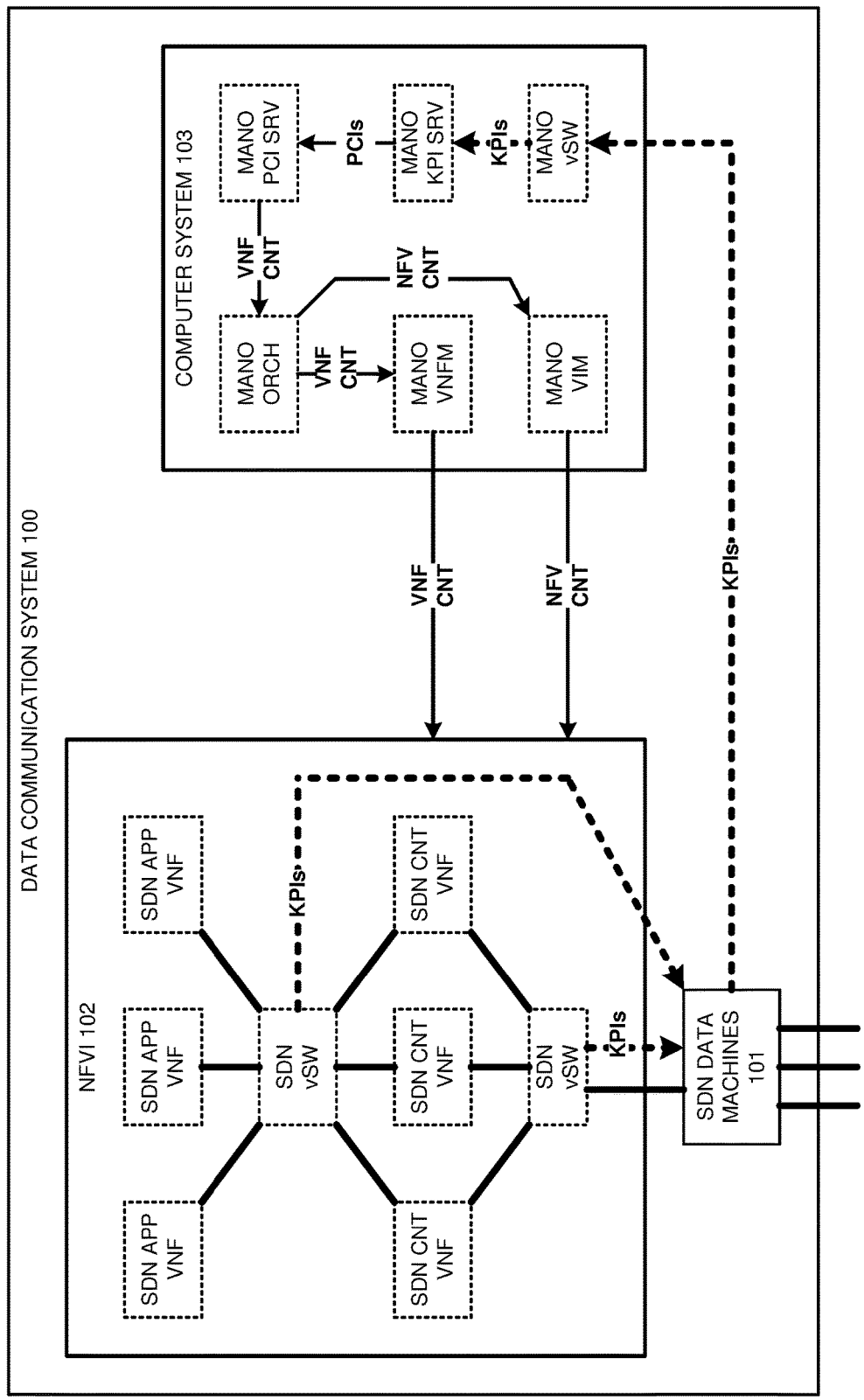

Referring to FIG. 2, data communication system 100 is further illustrated with an SDN architecture. NFVI 102 is shown with SDN application (APP) VNFs linked with SDN controller (CNT) VNFs through an SDN vSW. The SDN CNT VNFs are linked to SDN data machines 101 over another SDN vSW. Computer system 103 is shown with a MANO orchestrator (ORCH), VNF Manager (VNFM), Virtual Infrastructure Manager (VIM), vSW, KPI server, and PCI server. The MANO vSW is linked to SDN data machines 101.

To deliver a data service, the SDN application VNFs transfer SDN controller API calls to the SDN controller VNFs. The SDN controller VNFs receive and process the SDN controller API calls to generate and transfer SDN data machine API calls. SDN data machines 101 receive and process the SDN data machine API calls to perform actions on the user data and return SDN data machine API responses. The SDN controller VNFs receive and process the data machine API responses to transfer SDN controller responses to the SDN application VNFs.

The SDN vSWs measure SDN KPIs and transfer SDN KPI data to the MANO KPI server through the MANO vSW. In some examples, data machines 101, NFVI 102, application and controller VNFs, VIM, VNFM, and/or ORCH measure additional KPIs and transfer KPI data to the MANO KPI server. The MANO KPI server processes the SDN KPI data to generate various system indices referred to as Proxy Corresponding Indices (PCIs)—including combination PCIs (cPCIs). The MANO KPI server transfers the PCIs and cPCIs to the MANO PCI server.

The MANO PCI server processes the PCIs and cPCIs to control the SDN APP VNFs. In particular, the MANO PCI server processes the PCIs and cPCIs to darken and lighten NFVI 102 resources for individual SDN APP VNFs. For example, the SDN vSWs may measure and transfer VNF load KPIs, and the KPI server indexes the VNF load KPIs. The PCI server processes the VNF load indexes to identify individual SDN APP that should be darkened. SDN CNT VNFs may also be darkened.

The PCI server transfers VNF control data to the MANO ORCH. The MANO ORCH processes the VNF control data to generate corresponding VNF control data for the VNFM and NFV control data for the VIM. The MANO VIM and VNFM implement the NFV and VNF controls through NFVI 102. For example, NFVI 102 may darken one of the SDN APP VNFs by restricting its data processing, storage, and/or communication resources. The VNFM may notify the VNF and/or other VNFs of the VNF darkening. The VIM directs NFVI 102 to perform the VNF darkening.

Figure 3:
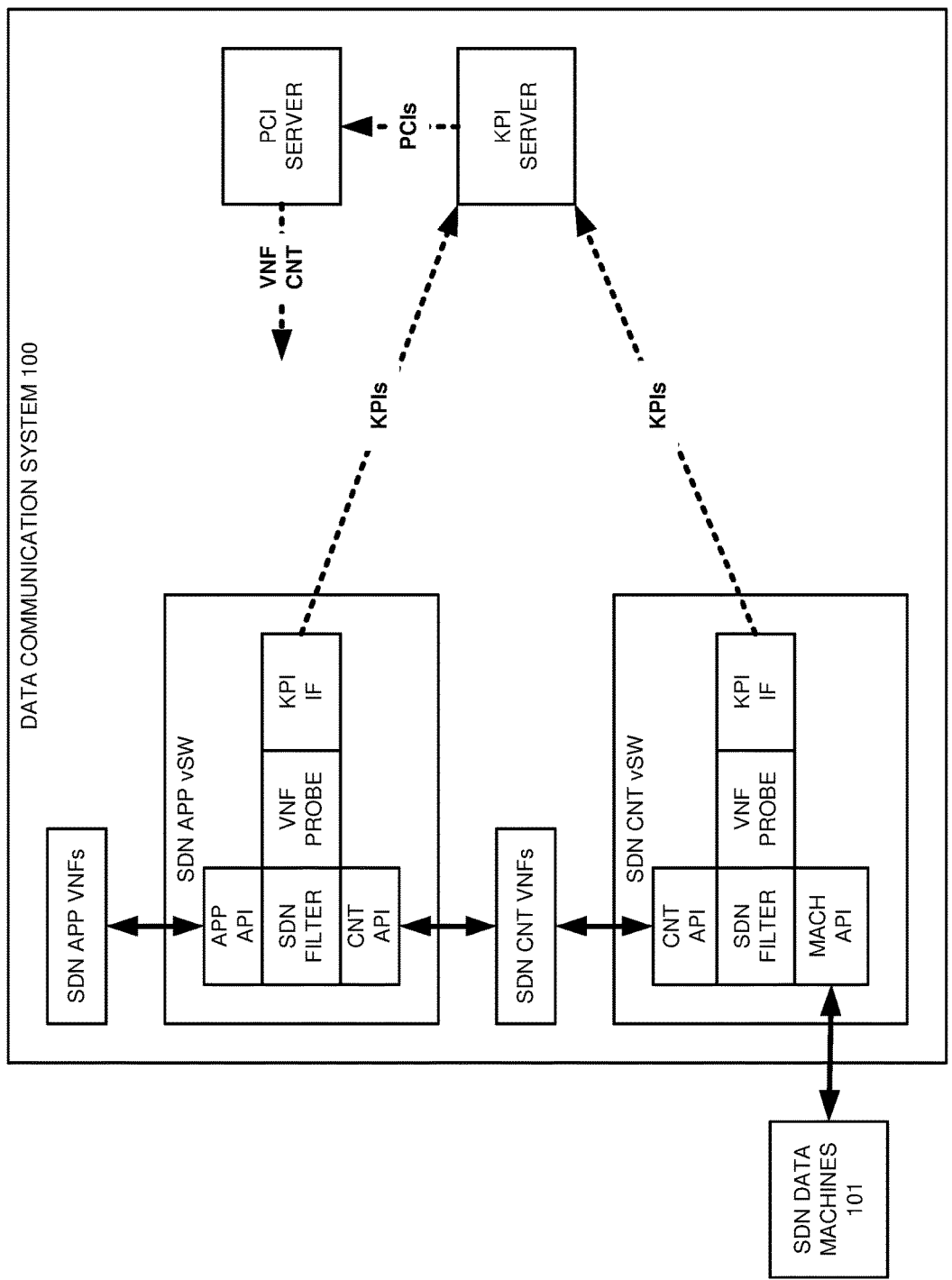

Referring to FIG. 3, the vSWs are further described for data communication system 100. The SDN APP VNFs communicate with the SDN CNT VNFs through an SDN APP vSW. The SDN APP vSW has an APP API to exchange API calls and responses with the SDN APP VNFs. The SDN APP vSW also has a CNT API to exchange the API calls/responses with the SDN CNT VNFs. The SDN filter routes the API calls/responses between the APP API and the CNT API. The SDN filter transfers select API calls, responses, and metadata (like API counts) to a VNF probe. The VNF probe processes the information from the SDN filter to generate KPIs like APP VNF load, CNT VNF load, and data machine throughput.

The SDN CNT vSW has a CNT API to exchange API calls and responses with the SDN CNT VNFs. The SDN CNT vSW also has a Machine (MACH) API to exchange the API calls/responses with SDN data machines 101. The SDN filter routes the API calls/responses between the CNT API and the MACH API. The SDN filter transfers select API calls, responses, and metadata (like API counts) to a VNF probe. The VNF probe processes the information from the SDN filter to generate KPIs like APP VNF load, CNT VNF load, and data machine throughput. The VNF probe transfers the KPIs to the KPI server over vSW KPI interfaces.

The VNF probes may inserted into existing vSWs or deployed in a new vSW. The NSD, VNFD, and VNFFG may specify the placement of these vSWs and virtual probes. The VNF probes may be configured to detect and measure KPI data for specific users, networks, NFVIs, VNFs, and the like. The VNF probes may be configured to generate the KPI data based on specified API call/response type.

The KPI server processes the SDN KPI data to generate various Proxy Corresponding Indices (PCIs)—including combination PCIs (cPCIs). The KPI server transfers the PCIs and cPCIs to the PCI server. The PCI server processes the PCIs and cPCIs to generate SDN VNF control data. In particular, the PCI server processes the PCIs and cPCIs to darken and lighten the NFVI for individual SDN APP VNFs and possibly for individual SDN CNT VNFs.

For example, the VNF probes may measure and transfer VNF APP load KPIs. The KPI server indexes the VNF APP load KPIs into VNF load PCIs. The PCI server processes the VNF load PCIs to identify individual SDN APP VNFs and/or individual CNT VNFs to darken or lighten. The PCI server transfers VNF control data to darken or lighten the SDN VNFs in the NFVI 102.

Figure 4:
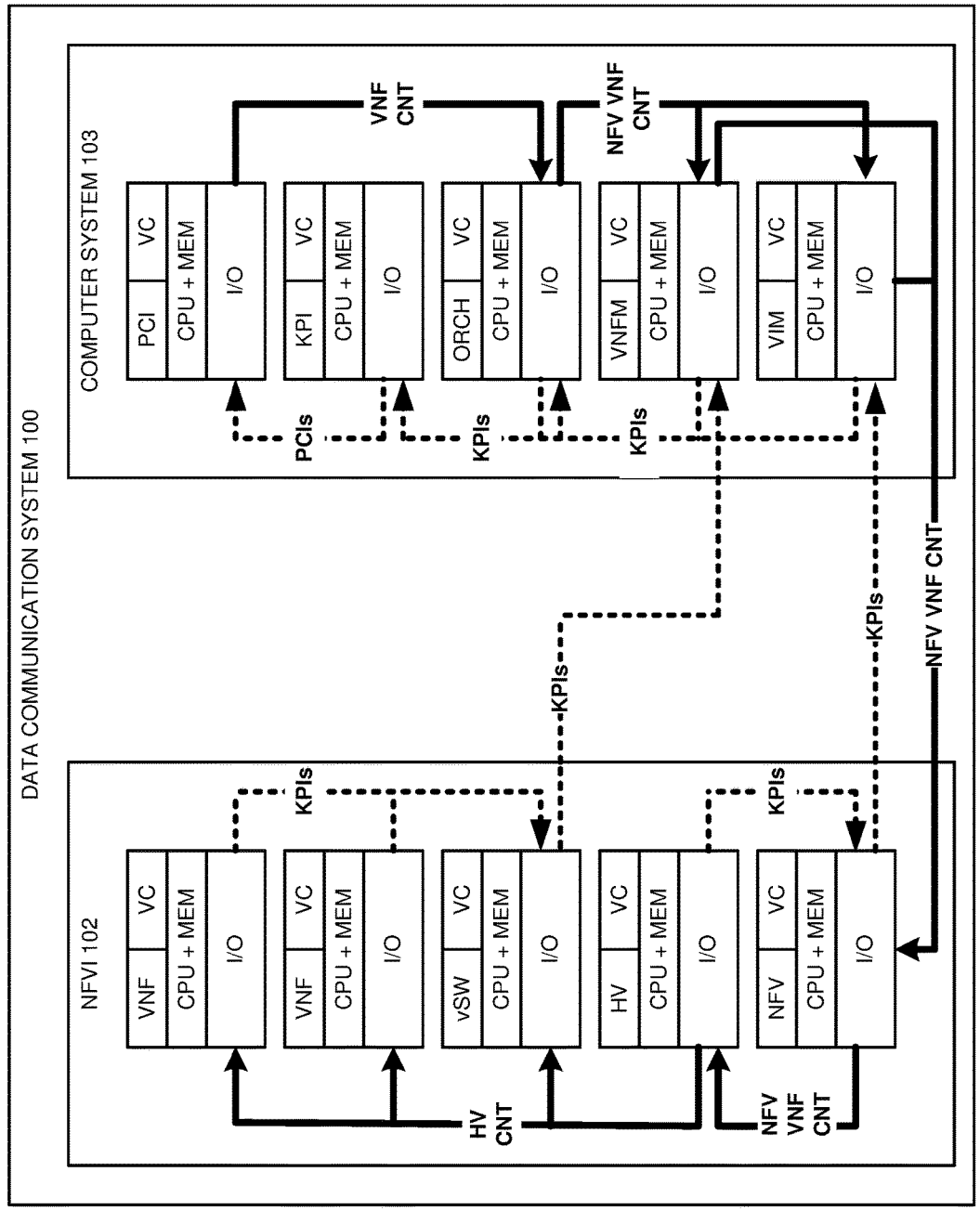

Referring to FIG. 4, data communication system 100 is further illustrated with an NFV architecture. NFVI 102 and computer system 103 are shown with Central Processing Unit cores (CPUs), memory units (MEM), and Input/Output transceivers (I/O). This specific hardware design is simplified for illustrative purposes, and actual hardware implementations will vary. In NFVI 102, two VNFs and their Virtual Containers (VCs) execute on CPU cores. A vSW and its VC execute on another CPU core to support the two VNFs. A hypervisor (HV) and VC execute on a CPU core to control VNF access to the CPU cores, MEM, and I/O. An NFV interface and VC execute on a CPU core to communicate with computer system 103.

In computer system 103, an ORCH and VC execute on a CPU core to orchestrate NFVI 102. A VIM and VC execute on a CPU core to direct NFVI 102 for the ORCH. A VNFM and VC execute on another CPU core to manage VNFs in NFVI 102 for the ORCH. A KPI server and VC execute on a CPU core to translate KPIs into PCIs. A PCI server and VC execute on a CPU core to translate the PCIs into VNF control data.

The VNFs, vSW, HV, and NFV interface all generate KPIs. The VNFs and vSW transfer their KPIs to the VNFM. The HV and NFV interface transfer their KPIs to the VIM. The VNFM and VIM generate their own KPIs and transfer the KPI data to the KPI server. In alternative examples, the vSW and the NFV interface may transfer the KPI data directly to the KPI server to bypass the VNFM and the VIM.

The KPI server processes the KPIs to generate PCIs and cPCIs for the PCI server. The PCI server processes the PCIs and cPCIs to generate VNF control data. The PCI server transfers the VNF control data to the ORCH. The ORCH processes the VNF control data to generate corresponding NFV VNF control data for the VNFM and the VIM. The VIM and VNFM transfer NFV VNF control data to the NFV interface. The NFV interface transfers the NFV VNF control data to the HV. The HV exerts HV control to remove resources from darkened VNFs and restore resources to lighted VNFs as instructed by the NFV control data. For example, the PCI server may transfer VNF control data to darken an SDN VNF by removing 95% of its CPU access, 90% of its I/O access, and 80% of its MEM access.

Figure 5:
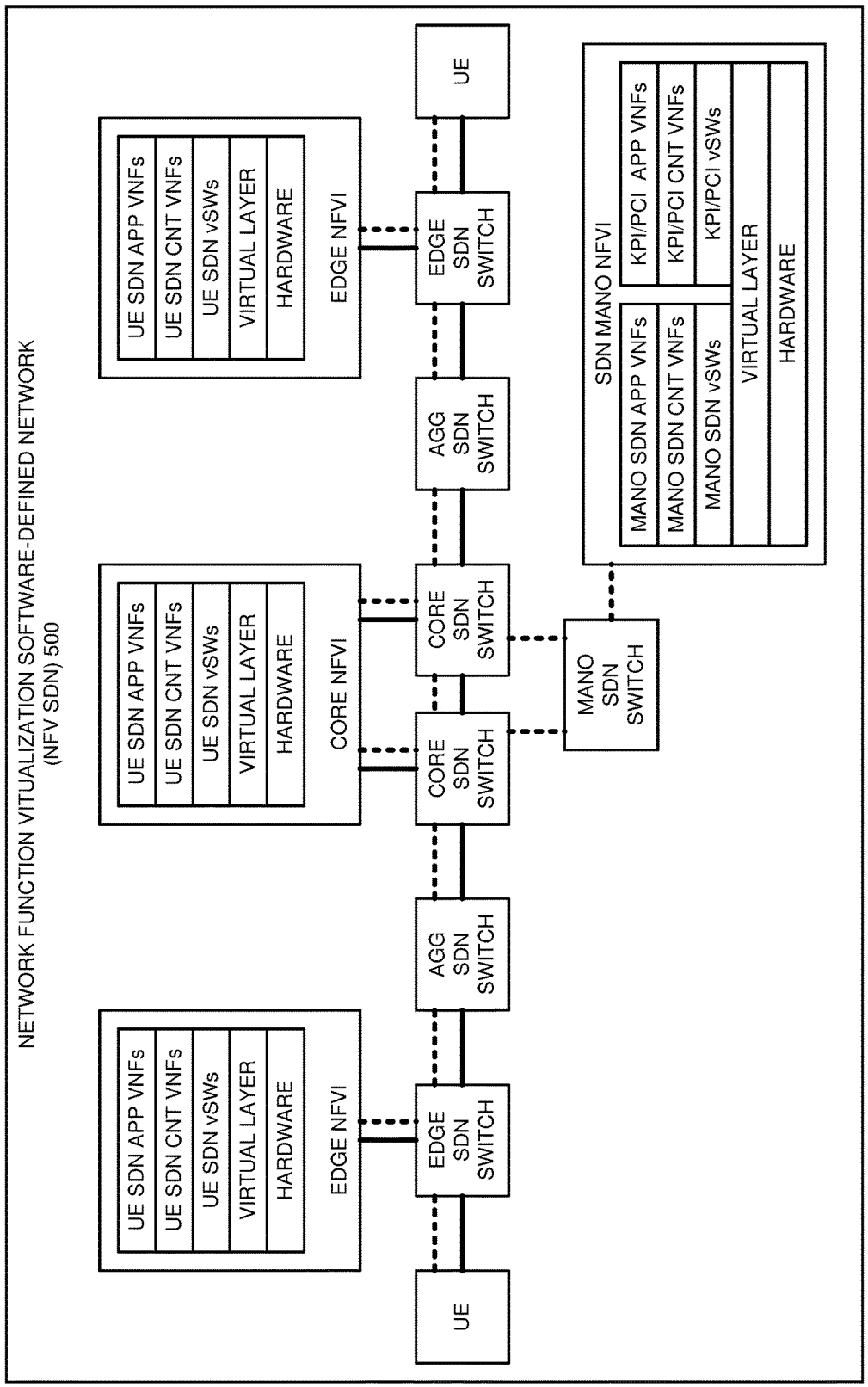
FIG. 5 illustrates an NFV SDN to control VNFs.

FIG. 5 illustrates Network Function Virtualization (NFV) Software Defined Network (SDN) 500 to control Virtual Network Functions (NFVs). NFV SDN 500 is an example of data communication system 100, although system 100 may use alternative configurations and operations. NFV SDN 500 comprises: User Equipment (UE), edge SDN switches, aggregation (AGG) SDN switches, core SDN switches, a MANO SDN switch, edge NFVIs, a core NFVI, and an SDN MANO NFVI. The NFVIs comprise hardware such as CPU cores, flash memories, and I/O transceivers.

The NFVIs execute virtual layer software to provide a virtualized processing environment. Under the control of the MANO system, the virtual layers execute various SDN VNFs. In the edge and core NFVIs, the virtual layers execute UE SDN virtual switch (vSW) VNFs, UE SDN controller (CNT) VNFs, and UE SDN application (APP) VNFs. In the MANO NFVI, the virtual layer executes MANO SDN vSW VNFs, MANO SDN CNT VNFs, MANO SDN APP VNFs, KPI/PCI vSW VNFs, KPI/PCI CNT VNFs, and KPI/PCI APP VNFs.

The MANO VNFs transfer networking data to the edge and core NFVI virtual layers to drive the execution of the UE SDN VNFs. To set-up a data session, between the UEs, one of the UEs transfers a session request to a UE SDN application VNF. The UE SDN application VNF informs other UE SDN application VNFs to extend the session. The UE SDN VNFs transfer SDN controller API calls for the UE session to their associated UE SDN controller VNFs. The UE SDN controller VNFs transfer SDN data machine API calls to the SDN switches.

API responses flow back to from the SDN switches to the controller VNFs and to the application VNFs. If needed, an SDN application VNF may direct an SDN controller VNF to drive an SDN data machine to deliver user data to an NFVI for heavier processing by the UE SDN vSW VNFs. For example, a given flow may be directed to a core SDN vSW/VNF to perform transcoding, decryption, or the like.

The UE SDN VNFs generate SDN KPI data as described herein. The SDN switches also generate SDN KPI data. The KPI/PCI VNFs exchange the SDN KPI data with the UE SDN VNFs and the SDN switches. The MANO VNFs may exchange the KPI data between the UE SDN VNFs and the KPI/PCI VNFs.

The KPI/PCI application VNFs process the KPI data from the UE SDN VNFs and SDN switches to develop a set of data service indices. The KPI/PCI application VNFs process the data service indices against various patterns of interest to identify associated VNF controls. In particular, the KPI/PCI application VNFs generate PCIs that indicate idle UE SDN VNFs for darkening, or that indicate busy UE SDN VNFs and a need to lighten its darkened supporting VNFs.

Figure 6:
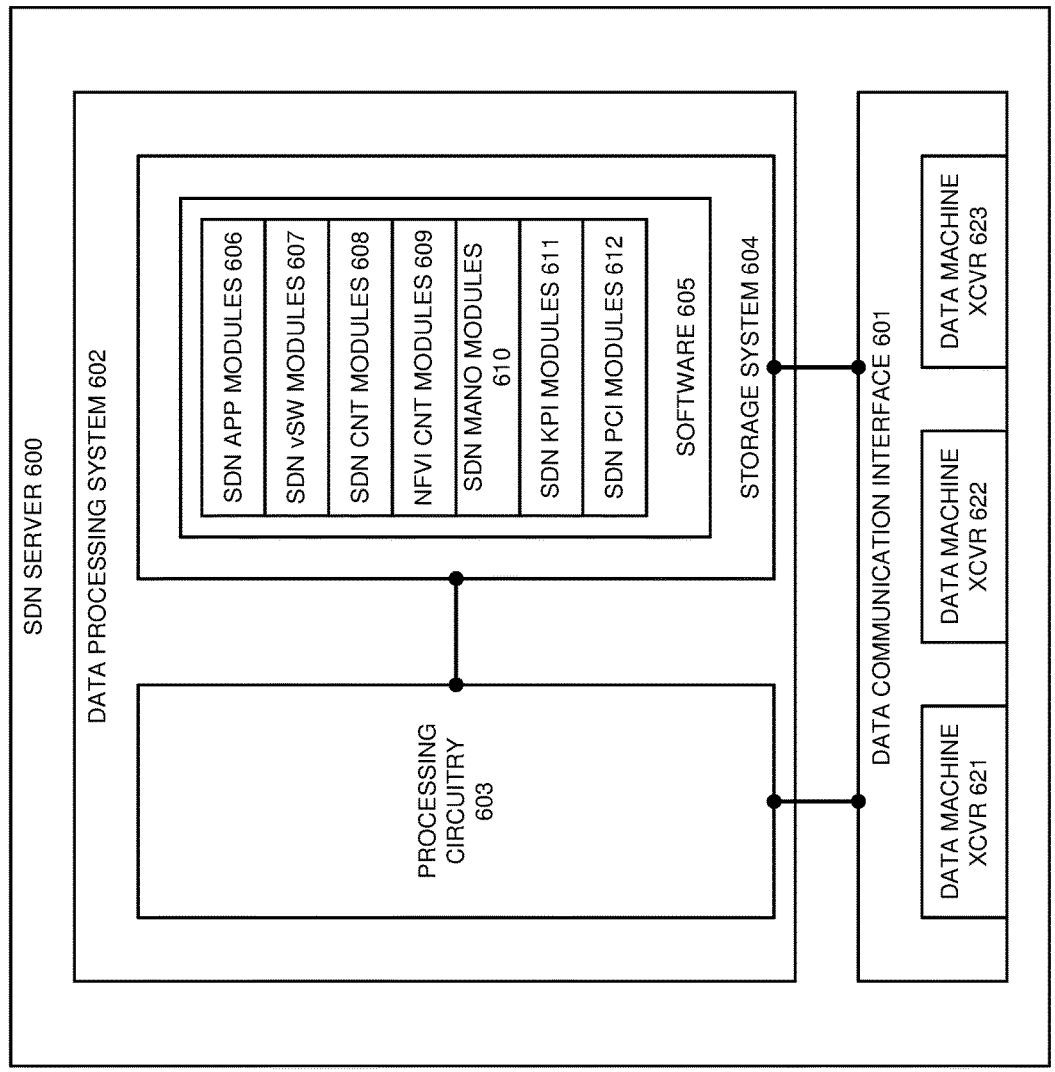
FIG. 6 illustrates an SDN server to control VNFs.

FIG. 6 illustrates Software Defined Network (SDN) server 600 to control Virtual Network Functions (NFVs). SDN server 600 comprises data communication interface 601 and data processing system 602. Data communication interface 601 comprises data machine transceivers 621-623. Data processing system 602 comprises processing circuitry 603 and storage system 604. Storage system 604 stores software 605. Software 605 includes respective software modules 606-612.

Data machine transceivers 611-613 comprise communication components, such as ports, bus interfaces, signal processors, memory, software, and the like. Processing circuitry 603 comprises server blades, circuit boards, bus interfaces, integrated circuitry, and associated electronics. Storage system 604 comprises non-transitory, machine-readable, data storage media, such as flash drives, disc drives, memory circuitry, servers, and the like. Software 605 comprises machine-readable instructions that control the operation of processing circuitry 603 when executed. Software 605 includes software modules 606-612. SDN server 600 may be centralized or distributed. All or portions of software 606-612 may be externally stored on one or more storage media, such as circuitry, discs, and the like. Some conventional aspects of SDN server 600 are omitted for clarity, such as power supplies, enclosures, and the like.

When executed by processing circuitry 603, software modules 606-612 direct circuitry 603 to perform the following operations. SDN application modules 606 process user and network data to drive SDN controller modules 608 to deliver data communication services to users. SDN vSW modules 607 comprises exchange these SDN controller API calls and responses between SDN application modules 606 and SDN controller modules 608. SDN controller modules 608 process the SDN controller API calls to generate SDN data machine API calls to drive SDN data machines to deliver data communication services to users. SDN vSW modules 607 exchange these SDN data machine API calls and responses between SDN controller modules 608 and the SDN data machines over data machine transceivers 611-613. NFVI control modules 609 include hypervisors, VCs, and NFVI software to implement NFV VNF controls like darkening and lightening VNFs. SDN MANO modules 610 include orchestrators, VNFMs, and VIMs to direct NFVI operations—including darkening and lightening VNFs. SDN modules 606-610 generate and transfer SDN KPI data like SDN chatter, NFVI transactions, user IP throughput to SDN KPI modules 611. SDN KPI modules 611 process the KPIs to generate PCIs and cPCIs for PCI modules 612. SDN PCI modules 611 process the PCIs and cPCIs to generate VNF control data—including data to darken and lighten VNFs—for transfer to the orchestrators in SDN MANO modules 610.

Figure 7:
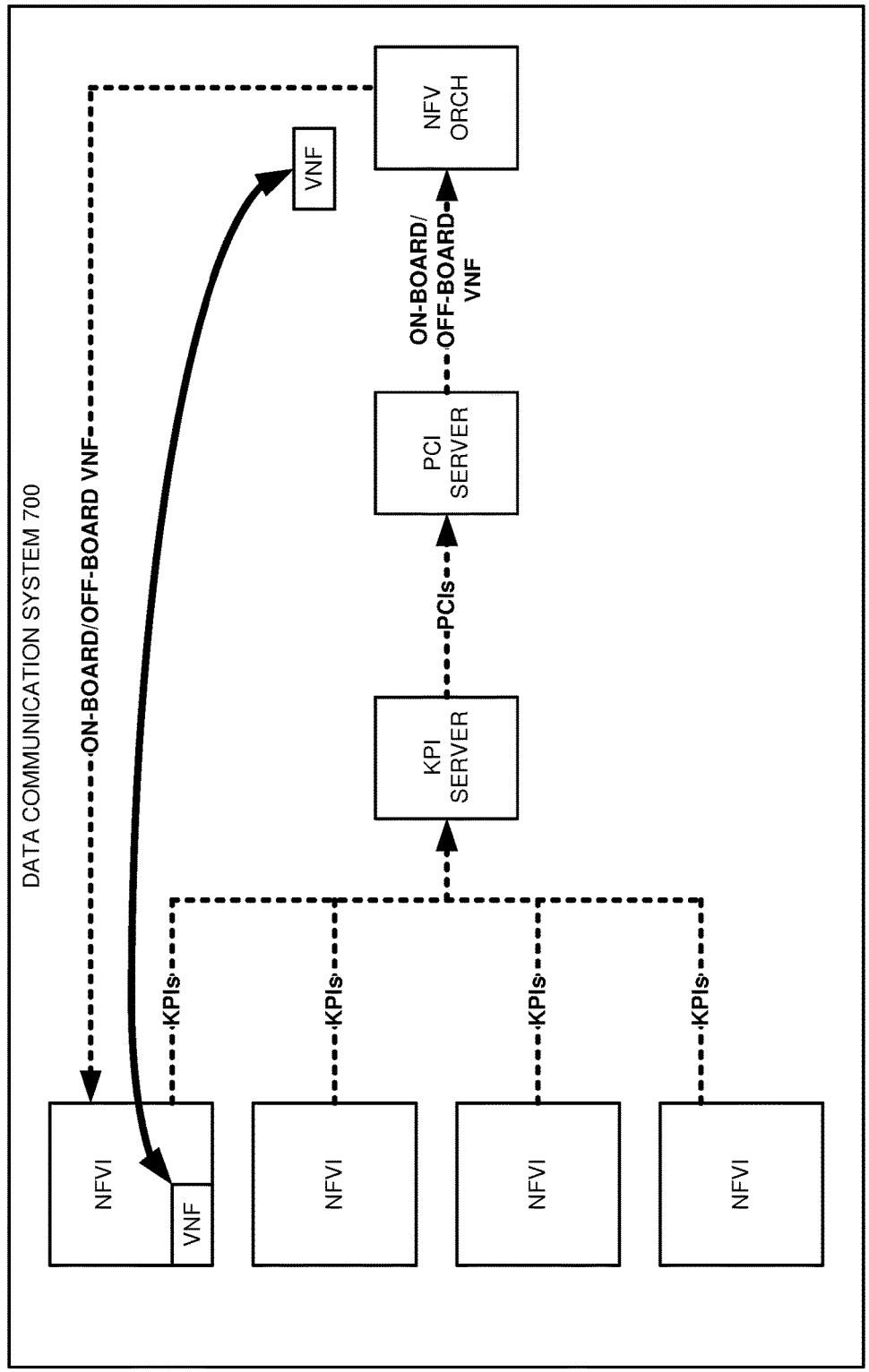
FIG. 7 illustrates a data communication system to on-board and off-board SDN VNFs in a Network Function Virtualization Infrastructure (NFVI).

FIG. 7 illustrates data communication 700 system to on-board and off-board Software Defined Network (SDN) Virtual Network Functions (VNFs) in a Network Function Virtualization Infrastructure (NFVI). Data communication system 700 is an example of system 100, but system 100 may have alternative configurations and operations. Data communication system 700 comprises a KPI server, PCI server, NFV orchestrator, and multiple NFVIs. The NFVIs execute VNFs and transfer KPIs to the KPI server. The KPI server aggregates and processes the KPI data to generate PCIs for the PCI server. The PCI server processes the PCIs to determine when and where to on-board a new VNF. Here, the PCI server directs the NFV orchestrator to on-board the new VNF in the top NFVI. For example, the KPIs from the lower three NFVIs may indicate SDN congestion or poor NFVI support, and thus, the top NFVI is selected for on-boarding. In another example, the KPIs from the top NFVI may indicate SDN congestion and a non-responsive VNF, and thus, the VNF in the top NFVI may be selected for off-boarding.

Figure 8:
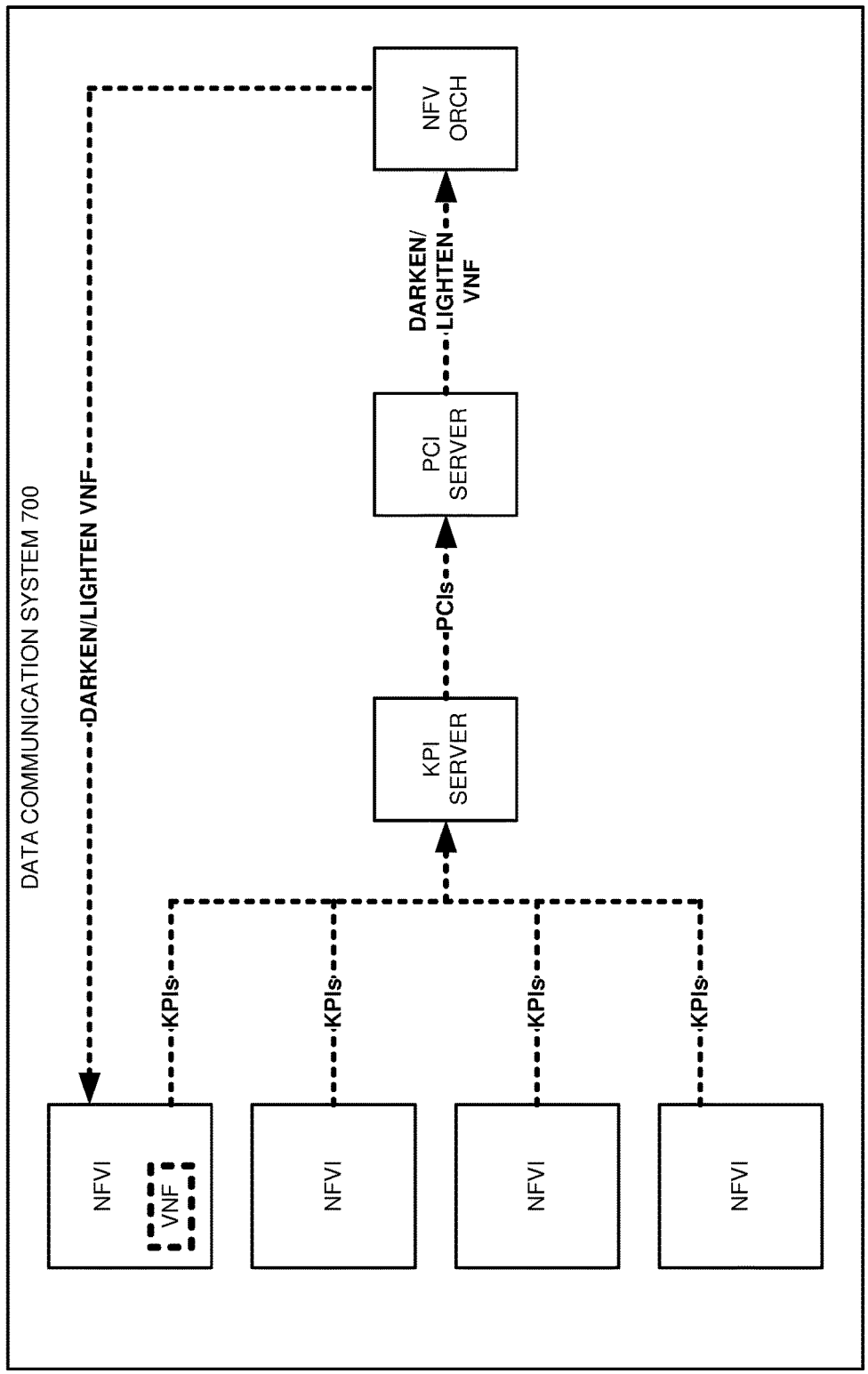
FIG. 8 illustrates a data communication system to darken and lighten SDN VNFs in an NFVI.

FIG. 8 illustrates data communication system 700 to darken and lighten SDN VNFs in an NFVI. The NFVIs again execute VNFs and transfer KPIs to the KPI server. The KPI server aggregates and processes the KPI data to generate PCIs for the PCI server. The PCI server processes the PCIs to select VNFs for darkening and lightening. Here, the PCI server directs the NFV orchestrator to darken the VNF in the top NFVI. For example, the KPIs from the top NFVI may indicate a mostly idle VNF, and thus, the VNF is selected for darkening. In another example, the KPIs from the top NFVI may indicate heavy VNF loads, and thus, the darkened VNF is selected for lightening to support the busy VNFs.

Figure 9:
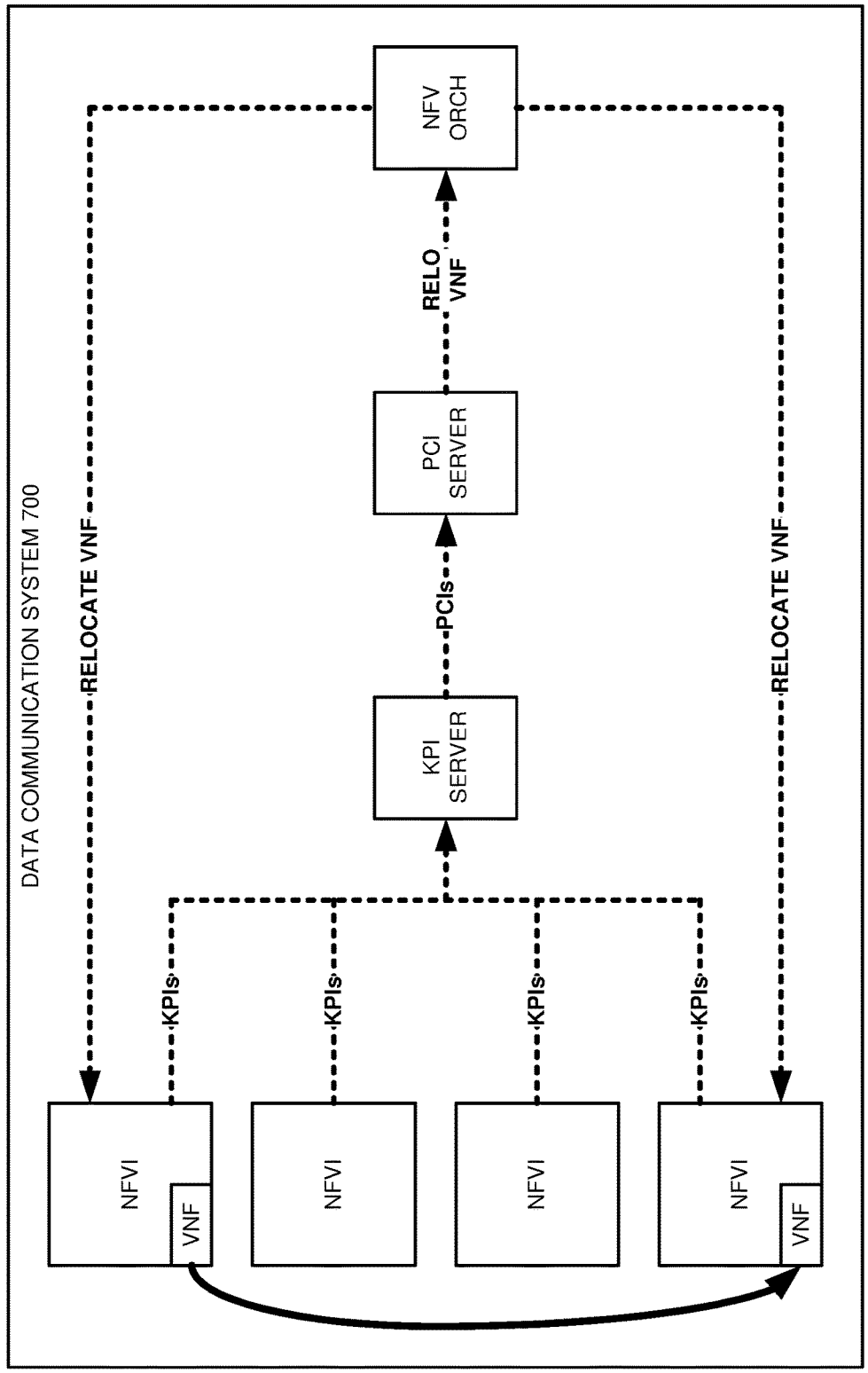
FIG. 9 illustrates a data communication system to relocate SDN VNFs across NFVIs.

FIG. 9 illustrates data communication system 700 to relocate SDN VNFs across NFVIs. The NFVIs again execute VNFs and transfer KPIs to the KPI server. The KPI server aggregates and processes the KPI data to generate PCIs for the PCI server. The PCI server processes the PCIs to select NFVIs and VNFs for VNF relocation. Here, the PCI server directs the NFV orchestrator to relocate the VNF in the top NFVI to the bottom NFVI. For example, the KPIs from the top NFVI may indicate a poor VNF memory resources while the bottom NFVI KPIs show solid VNF memory resources. Thus, the VNF relocated from the top NFVI with poor VNF memory resources to the bottom NFVI with solid VNF memory resources.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Network Function Virtualization (NFV) Software Defined Network (SDN) to control NFV resources consumed by Virtual Network Functions (VNFs) that support a data service, the method comprising:
    an NFV Infrastructure (NFVI) executing SDN application VNFs, SDN controller VNFs, and NFVI virtual Switches (vSWs) to support the data service,
    the SDN application VNFs, the SDN controller VNFs, and the NFVI vSWs responsively transferring SDN Key Performance Indicators (KPIs) to an NFV Management and Orchestration (MANO) Virtual Infrastructure Manager (VIM) and to a MANO VNF Manager (VNFM);
    the MANO VIM receiving the SDN KPIs and transferring the SDN KPIs to a MANO KPI server;
    the MANO VNFM receiving the SDN KPIs and transferring the SDN KPIs to the MANO KPI server;
    the MANO KPI server processing the SDN KPIs to generate VNF control data to darken one of the SDN VNFs and processing the VNF control data to generate and transfer NFV control data to darken the one SDN VNF; and
    the NFVI darkening the one SDN VNFs responsive to the NFV control data by restricting access to NFVI hardware for the one SDN VNF.

2. The method of claim 1 wherein restricting access to the NFVI hardware for the one SDN VNF comprises reducing an amount of Central Processing Unit (CPU) resources consumed by the one SDN VNF.

3. The method of claim 1 wherein restricting access to the NFVI hardware for the one SDN VNF comprises reducing an amount of memory resources consumed by the one SDN VNF.

4. The method of claim 1 wherein restricting access to the NFVI hardware for the one SDN VNF comprises reducing an amount of Input/Output (I/O) resources consumed by the one SDN VNF.

5. The method of claim 1 wherein the MANO KPI server processing the SDN KPIs to generate the VNF control data to darken the one SDN VNF comprises the MANO KPI server processing the SDN KPIs to generate Proxy Correlation Indices (PCIs) and processing the PCIs to select the one SDN VNF to darken.

6. A Network Function Virtualization (NFV) Software Defined Network (SDN) to control NFV resources consumed by Virtual Network Functions (VNFs) that support a data service, the NFV SDN comprising:

an NFV Infrastructure (NFVI) circuitry configured to execute SDN application VNFs, SDN controller VNFs, and NFVI virtual Switches (vSWs) to support the data service;

the SDN application VNFs, the SDN controller VNFs, and the NFVI vSWs configure to responsively transfer SDN Key Performance Indicators (KPIs) to an NFV Management and Orchestration (MANO) Virtual Infrastructure Manager (VIM) and to a MANO VNF Manager (VNFM);

the MANO VIM configured to receive the SDN KPIs and transfer the SDN KPIs to a MANO KPI server;

the MANO VNFM configured to receive the SDN KPIs and transfer the SDN KPIs to the MANO KPI server;

the MANO KPI server configured to process the SDN KPIs to generate VNF control data to darken one of the SDN VNFs and process the VNF control data to generate and transfer NFV control data to darken the one SDN VNF; and the NFVI circuitry configured to darken the one SDN VNFs responsive to the NFV control data by restricting access to NFVI hardware for the one SDN VNF.

7. The NFV SDN of claim 6 wherein the NFVI circuitry is configured to restrict access to the NFVI hardware for the one SDN VNF by reducing an amount of Central Processing Unit (CPU) resources consumed by the one SDN VNF.

8. The NFV SDN of claim 6 wherein the NFVI circuitry is configured to restrict access to the NFVI hardware for the one SDN VNF by reducing an amount of memory resources consumed by the one SDN VNF.

9. The NFV SDN of claim 6 wherein the NFVI circuitry is configured to restrict access to the NFVI hardware for the one SDN VNF by reducing an amount of Input/Output (I/O) resources consumed by the one SDN VNF.

10. The NFV SDN of claim 6 wherein the MANO KPI server is configured to process the SDN KPIs to generate Proxy Correlation Indices (PCIs) and process the PCIs to select the one SDN VNF to darken.

* * * * *